(12) United States Patent
Sczomak et al.

(10) Patent No.: US 9,629,189 B2
(45) Date of Patent: Apr. 18, 2017

(54) SYSTEM AND METHOD FOR ENABLING A USER TO ADJUST THE OPERATION OF A POWERTRAIN IN A VEHICLE, TO ADJUST THE APPEARANCE OF A USER INTERFACE DEVICE IN THE VEHICLE, AND/OR TO ADJUST VEHICLE NOISE

(71) Applicant: GM Global Technology Operations LLC, Detroit, MI (US)

(72) Inventors: David P. Sczomak, Troy, MI (US); Robert S. Levy, Leonard, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 141 days.

(21) Appl. No.: 14/543,073

(22) Filed: Nov. 17, 2014

(65) Prior Publication Data
US 2016/0138508 A1    May 19, 2016

(51) Int. Cl.
| | |
|---|---|
| *G06F 7/00* | (2006.01) |
| *H04W 76/02* | (2009.01) |
| *B60K 35/00* | (2006.01) |
| *F02D 41/24* | (2006.01) |
| *F02D 41/28* | (2006.01) |
| *F02D 41/00* | (2006.01) |
| *F02D 41/06* | (2006.01) |
| *F02D 37/02* | (2006.01) |

(52) U.S. Cl.
CPC ............ *H04W 76/02* (2013.01); *B60K 35/00* (2013.01); *F02D 41/2422* (2013.01); *F02D 41/28* (2013.01); *B60K 2350/352* (2013.01); *B60K 2350/357* (2013.01); *F02D 37/02* (2013.01); *F02D 41/0007* (2013.01); *F02D 41/0087* (2013.01); *F02D 41/064* (2013.01); *F02D 2041/001* (2013.01); *F02D 2200/604* (2013.01)

(58) Field of Classification Search
None
See application file for complete search history.

(56) References Cited

U.S. PATENT DOCUMENTS

| | | |
|---|---|---|
| 6,230,084 B1 | 5/2001 | Kijima et al. |
| 6,784,379 B2 | 8/2004 | Breed et al. |
| 6,917,801 B2 | 7/2005 | Witte et al. |

(Continued)

FOREIGN PATENT DOCUMENTS

| | | |
|---|---|---|
| CN | 101326511 A | 12/2008 |
| CN | 101763741 A | 6/2010 |

*Primary Examiner* — Adam Alharbi

(57) ABSTRACT

A system according to the principles of the present disclosure includes a communication module and a control module. The communication module transmits a first wireless signal indicating a request from a user of a vehicle to adjust operation of a powertrain in the vehicle, a display in the vehicle, and/or a noise actuator in the vehicle. The communication module receives a second wireless signal enabling operation of the powertrain, the display, and/or the noise actuator to be adjusted according to the request. The control module controls the powertrain, the display, and/or the noise actuator based on a first set of values for a control parameter before the second wireless signal is received. The control module controls the powertrain, the display, and/or the noise actuator based on a second set of values for the control parameter after the second wireless signal is received.

22 Claims, 6 Drawing Sheets

(56) References Cited

U.S. PATENT DOCUMENTS

| | | |
|---|---|---|
| 6,947,881 B1 | 9/2005 | Murakami et al. |
| 7,042,347 B2 | 5/2006 | Cherouny |
| 7,062,362 B2 | 6/2006 | Obradovich et al. |
| 7,136,710 B1* | 11/2006 | Hoffberg ............... G06F 3/0482 382/155 |
| 7,139,660 B2 | 11/2006 | Sarkar et al. |
| 7,444,241 B2 | 10/2008 | Grimm |
| 7,818,097 B2 | 10/2010 | Fein et al. |
| 7,979,177 B2 | 7/2011 | Hermann et al. |
| 8,258,934 B2 | 9/2012 | Filev et al. |
| 8,312,708 B2 | 11/2012 | Bennet et al. |
| 8,370,030 B1 | 2/2013 | Gurin |
| 8,437,919 B2 | 5/2013 | Wang et al. |
| 8,442,699 B2 | 5/2013 | Takamatsu et al. |
| 9,073,555 B2 | 7/2015 | Otanez et al. |
| 2007/0150196 A1 | 6/2007 | Grimm |
| 2008/0228358 A1 | 9/2008 | Wang et al. |
| 2012/0036016 A1* | 2/2012 | Hoffberg ................ G05B 15/02 705/14.58 |
| 2013/0131861 A1* | 5/2013 | Yechuri ................ G07F 17/005 700/232 |
| 2013/0197715 A1 | 8/2013 | Otanez et al. |

* cited by examiner

SYSTEM AND METHOD FOR ENABLING A USER TO ADJUST THE OPERATION OF A POWERTRAIN IN A VEHICLE, TO ADJUST THE APPEARANCE OF A USER INTERFACE DEVICE IN THE VEHICLE, AND/OR TO ADJUST VEHICLE NOISE

FIELD

The present disclosure relates to systems and methods for enabling a user to adjust the operation of a powertrain in a vehicle, to adjust the appearance of a user interface device in the vehicle, and/or to adjust vehicle noise.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

SUMMARY

A system according to the principles of the present disclosure includes a communication module and a control module. The communication module transmits a first wireless signal indicating a request from a user of a vehicle to adjust operation of a powertrain in the vehicle, a display in the vehicle, and/or a noise actuator in the vehicle. The communication module receives a second wireless signal enabling operation of the powertrain, the display, and/or the noise actuator to be adjusted according to the request. The control module controls the powertrain, the display, and/or the noise actuator based on a first set of values for a control parameter before the second wireless signal is received. The control module controls the powertrain, the display, and/or the noise actuator based on a second set of values for the control parameter after the second wireless signal is received.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
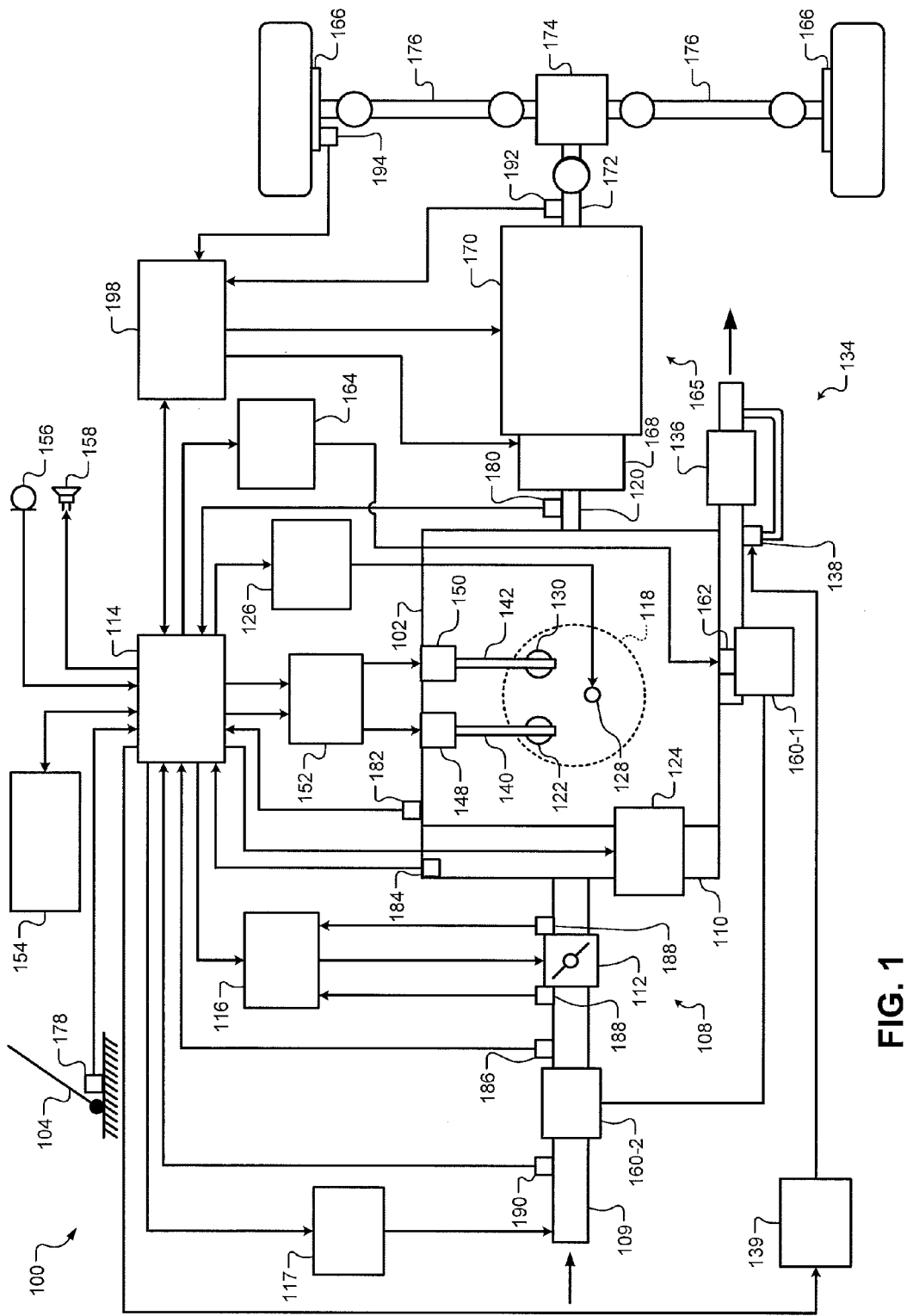
FIG. 1 is a functional block diagram of an example engine system according to the principles of the present disclosure.

A powertrain control system typically controls a vehicle powertrain, including an engine and a transmission, using powertrain control parameters. In one example, the powertrain control parameters include a throttle area, fuel injection timing, a fuel injection amount, spark timing, a transmission shift schedule, and/or a boost amount. The values of the powertrain control parameters are determined using a predetermined relationship between vehicle operating conditions and the powertrain control parameters. The predetermined relationship may be embodied in one or more lookup tables. In one example, the vehicle operating conditions include crankshaft position, intake airflow, manifold pressure, engine coolant temperature, and/or vehicle speed.

When developing the lookup tables, developers typically strike a balance between improving fuel economy, increasing torque and power output of the engine, and improving the ability of the engine to start in cold ambient temperatures. However, the balance that is struck may not match the preferences of a customer that purchases the vehicle. For example, the customer may desire additional torque and power output at the expense of fuel economy or vice versa. In addition, the preferences of the customer may change over time and/or for temporary periods. For example, the customer may initially desire additional torque and power output when the customer purchases the vehicle, and then the customer may desire an increase in fuel economy as the vehicle ages. In another example, the customer may desire additional torque and power output on weekends, and desire improved fuel economy on weekdays.

A powertrain control system according to the present disclosure enables a customer to adjust operation of the powertrain according to the customer's preference. In one example, the powertrain control system uses a user interface device, such as a touchscreen, to provide the customer with various levels of fuel economy, torque and power output, and/or cold startability. The customer may then use the user interface device to select a level of fuel economy, toque and power output, and/or cold startability that is different from the current level. In turn, the powertrain control system relays the customer's request to a remote server using a wireless communication network such as a wireless telephone network or a satellite communication network. The remote server may then transmit a wireless signal to the powertrain control system enabling the adjustment. In turn, the powertrain control system controls the powertrain according to the selected level of fuel economy, torque and power output, and/or cold startability.

The customer may also use the user interface device to select a period associated with the selected level of powertrain operation. For example, the customer may schedule the adjustment for a year, a weekend, or a period corresponding to a vacation or trip. Before the remote server transmits the wireless signal enabling the adjustment, the remote server may confirm that the customer has paid a subscription fee associated with the selected level and/or the selected period. The customer may pay the subscription fee using the user interface device or an internet-enabled device.

A control system and method according to the present disclosure may also enable the customer to adjust operation of systems other than the powertrain based on the customer's preference in a similar manner. For example, the control system and method may enable the customer to adjust the noise perceived in a cabin of the vehicle by adjusting operation of a muffler bypass valve and/or speakers disposed in the cabin. In another example, the control system and method may enable the customer to adjust the appearance of a display in the vehicle.

Referring now to FIG. 1, an example implementation of a vehicle system 100 includes an engine 102 that combusts an air/fuel mixture to produce drive torque for a vehicle. The amount of drive torque produced by the engine 102 may be based on the position of an accelerator pedal 104. The amount of drive torque produced by the engine 102 may also be based on a cruise control system, which may be an adaptive cruise control system that varies vehicle speed to maintain a predetermined following distance.

Air is drawn into the engine 102 through an intake system 108. For example only, the intake system 108 may include an intake duct 109, an intake manifold 110 and a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

In various implementations, the intake duct 109 and/or the intake manifold 110 may have an adjustable length. In one example, the intake duct 109 may include a first section, a second section, and an actuator, such as a servomotor, that inserts the first section into the second section in a telescoping manner to decrease the length of the intake duct 109. Conversely, the actuator withdraws the first section from the second section to increase the length of the intake duct 109. In another example, the intake duct 109 may include a first path having a first length, a second path having a second length that is greater than the first length, and an actuator, such as a control valve, that directs intake air into the first path or the second path. In either example, an intake actuator module 117 regulates the actuator to control the length of the intake duct 109 based on a signal from the ECM 114.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft 120, two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 to generate a spark in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a spark timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102.

During the combustion stroke, combustion of the air/fuel mixture drives the piston down, thereby driving the crankshaft 120. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134.

The exhaust system 134 may include a muffler 136 and a bypass valve 138. The bypass valve 138 allows exhaust gas to bypass the muffler 136 when the bypass valve 138 is open. An exhaust actuator module 139 may control the bypass valve 138 based on a signal from the ECM 114.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The time at which the intake valve 122 is opened may be varied with respect to piston TDC by an intake cam phaser 148. The time at which the exhaust valve 130 is opened may be varied with respect to piston TDC by an exhaust cam phaser 150. A valve actuator module 152 may control the positions of the intake and exhaust cam phasers 148 and 150 based on signals from the ECM 114. When implemented, variable valve lift may also be controlled by the valve actuator module 152.

The valve actuator module 152 may deactivate the cylinder 118 by disabling opening of the intake valve 122 and/or the exhaust valve 130. The valve actuator module 152 may disable opening of the intake valve 122 by decoupling the intake valve 122 from the intake cam phaser 148. Similarly, the valve actuator module 152 may disable opening of the exhaust valve 130 by decoupling the exhaust valve 130 from the exhaust cam phaser 150. In various implementations, the valve actuator module 152 may control the intake valve 122 and/or the exhaust valve 130 using devices other than camshafts, such as electromagnetic or electrohydraulic actuators.

The vehicle system 100 may include a user interface device 154 such as an instrument panel, a touchscreen, a display, a stereo, a telecommunication system, and/or a navigation system. The vehicle system 100 may also include a microphone 156 and one or more speakers 158, which may be disposed within a cabin of the vehicle and may be in communication with the user interface device 154. A user of the vehicle may make certain selections using the user interface device 154 and/or the microphone 156. For example, the user may tune the stereo to a desired station or make a telephone call by touching a touchscreen of the user interface device 154 and/or by providing a voice command to the microphone 156. The user interface device 154 may communicate with the user by sending voice messages to the user through the speakers 158. In addition, the stereo and/or the telecommunication system may provide audio in the cabin of the vehicle through the speakers 158.

The vehicle system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, which compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

Torque output at the crankshaft 120 is transferred through a drivetrain system 165 to wheels 166. In the example implementation of the vehicle system 100 shown in FIG. 1, the drivetrain system 165 includes a torque converter 168, a transmission 170, a drive shaft 172, a differential 174, and axle shafts 176. In other implementations, the drivetrain system 165 may not include one or more of these components. The torque converter 168, the transmission 170, and the differential 174 amplify engine torque by several gear ratios to provide axle torque at the axle shafts 176. The axle torque rotates the wheels 166 and thereby accelerates the vehicle. The engine 102 and the drivetrain system 165 may be collectively referred to as a powertrain.

The vehicle system 100 may measure the position of the accelerator pedal 104 using an accelerator pedal position (APP) sensor 178. The position of the crankshaft 120 may be measured using a crankshaft position (CKP) sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 188. The ambient temperature of air being drawn into the engine 102 may be measured using an intake air temperature (IAT) sensor 190. The output speed of the transmission 170 may be measured using a transmission output speed (TOS) sensor 192. The speed of the wheels 166 may be measured using a wheel speed sensor (WSS) 194. The ECM 114 may use signals from the sensors to make control decisions for the vehicle system 100.

The ECM 114 communicates with a transmission control module (TCM) 198. The TCM 198 sends a control signal to the torque converter 168 to couple the engine 102 to the transmission 170 or to decouple the engine 102 from the transmission 170. The TCM 198 sends a control signal to the transmission 170 to shift gears in the transmission 170. Although some of the sensor signals are shown provided to the TCM 198, the TCM 198 may relay these signals to the ECM 114. Alternatively, these signals may be provided to the ECM 114 directly. In various implementations, various functions of the ECM 114 and the TCM 198 may be integrated into one or more modules. In addition, the ECM 114, the TCM 198, and/or sensors that provide signals to the ECM 114 and/or the TOM 198 may be collectively referred to as a powertrain control system.

Figure 2A:
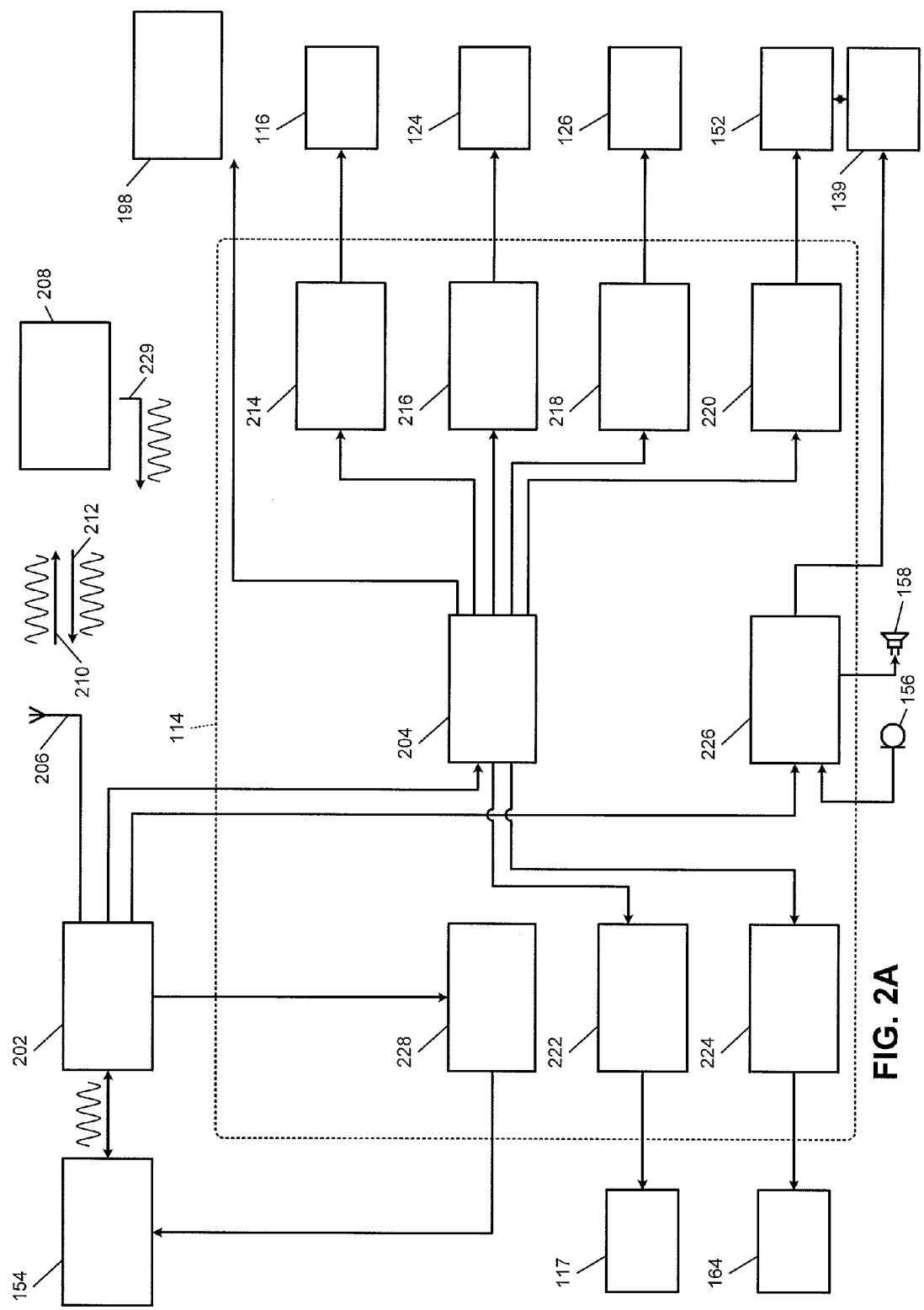
FIGS. 2A and 2B are functional block diagrams of an example control system according to the principles of the present disclosure.

Referring now to FIG. 2A, an example implementation of the ECM 114 communicates with a communication module 202 and includes a powertrain performance module 204. In various implementations, the ECM 114 may also include the communication module 202 or a portion thereof. The communication module 202 communicates with the user interface device 154 via a wireless (e.g., Bluetooth) and/or hardwired connection. The communication module 202 also communicates with an antenna 206, which enables the communication module 202 to communicate with a server 208 via a wireless communication network such as a wireless telephone network and/or a satellite communication network (e.g., OnStar®). The server 208 is separate from the vehicle and therefore may be referred to as a remote server.

The powertrain performance module 204 controls the performance of the powertrain in areas such as fuel economy, torque and power output, and the ability of the engine 102 to start in cold ambient temperatures, which may be referred to as cold startability. The powertrain performance module 204 controls the performance of the powertrain using powertrain control parameters. The powertrain control parameters may include a throttle area, fuel injection timing, a number of fuel injections per combustion event, an amount of fuel injected per injection, fuel pressure, and/or spark timing. The powertrain control parameters may also include cam phaser positions, intake manifold length, a wastegate position, and/or a transmission shift schedule.

The powertrain performance module 204 determines the values of the powertrain control parameters using a predetermined relationship between vehicle operating conditions and the powertrain control parameters. The predetermined relationship may be embodied in one or more lookup tables. The powertrain performance module 204 may store one or more sets of values for the powertrain control parameters corresponding to the one or more lookup tables. In one example, when the vehicle is initially assembled, the powertrain performance module 204 may control the powertrain using a first set of values for the powertrain control parameters that is stored in the powertrain performance module 204 prior to assembly.

The vehicle operating conditions may include the engine coolant temperature from the ECT sensor 182, the manifold pressure from the MAP sensor 184, the mass flow rate of intake air from the MAF sensor 186, and/or the intake air temperature from the IAT sensor 190. The vehicle operating conditions may also include engine speed and vehicle speed. The engine speed may be determined based on the crankshaft position from the CKP sensor 180. The vehicle speed may be determined based on the transmission output speed from the TOS sensor 192 and/or the wheel speed from the WSS sensor 194.

The user interface device 154 provides the user of the vehicle with various levels of powertrain performance such as various levels of fuel economy, torque and power output, and/or cold startability. The user may then use the user interface device 154 to select a level of a powertrain performance that is different from the current level. The user may also use the user interface device 154 to select a period associated with the selected level of powertrain performance. For example, the user may select a week, a year, and/or a period corresponding to a vacation or trip.

The communication module 202 receives a signal from the user interface device 154 indicating the selected level of powertrain performance and, if specified, a selected period associated therewith. The communication module 202 converts the signal received from the user interface device 154 into a first wireless signal 210 having a format that is readable on the wireless communication network. The communication module 202 then transmits the first wireless signal 210 using the antenna 206.

The user interface device 154 may provide the user with a plurality of levels for each area of powertrain performance. For example, the user interface device 154 may provide the user with first, second, and third levels for fuel economy, with the first level corresponding to the best fuel economy and the third level yielding the worst fuel economy. Similarly, the user interface device 154 may provide the user with first, second, and third levels for torque and power output and cold startability. In addition, selecting a different level for one area of powertrain performance may inherently involve selecting a different level for another area of powertrain performance. For example, if fuel economy and torque and power output are initially adjusted to the second level, and the user selects the first level for fuel economy, the user interface device 154 may automatically select the third level for the torque and power output.

When the server 208 receives the first wireless signal 210, the server 208 may transmit a second wireless signal 212 enabling the powertrain performance module 204 to adjust the powertrain performance to the selected level for the selected period. When the communication module 202 receives the second wireless signal 212, the communication module 202 converts the second wireless signal 212 into a signal having a format that is readable by the ECM 114. The communication module 202 then sends the converted signal to the powertrain performance module 204. In turn, the powertrain performance module 204 may switch from controlling the powertrain using the first set of values for the powertrain control parameters to controlling the powertrain using a second set of values for the powertrain control parameters. The powertrain performance module 204 may control the powertrain using the second set of values for the selected period, and then switch back to controlling the powertrain using the first set of values when the selected period ends.

The powertrain performance module 204 may receive the second set of values for the powertrain control parameters through the second wireless signal 212, and may delete the second set of values when the selected period ends. Alternatively, the second wireless signal 212 may receive the second set of values from a source other than the second wireless signal 212. For example, a plurality of sets of values for the powertrain control parameters, including the first and second sets, may be stored in the powertrain performance module 204 when the vehicle is assembled. In this case, the second wireless signal 212 may simply authorize the powertrain performance module 204 to control the powertrain using the second set of values.

Before the server 208 transmits the second wireless signal 212, the server 208 may confirm that the user has paid a subscription fee associated with the selected level of powertrain performance and/or the selected period associated therewith. In one example, for a powertrain performance upgrade, the subscription fee may be $9.99 United States dollars (USD) for a powertrain performance upgrade for a weekend, $49.99 USD per month, and $299.99 USD per year. The user may pay the subscription fee using the user interface device 154 and/or an internet-enabled device.

The powertrain performance module 204 may control the performance of the powertrain by sending desired values for the control parameters to corresponding control modules. The control modules may include a throttle control module 214, a fuel control module 216, a spark control module 218, a valve control module 220, an intake control module 222, a boost control module 224, and/or the TCM 198. The throttle control module 214 controls the throttle valve 112 by instructing the throttle actuator module 116 to achieve a desired throttle area. The fuel control module 216 controls fuel delivery to the cylinders by instructing the fuel actuator module 124 to achieve a desired number of fuel injections, a desired amount of fuel for each injection, and/or desired injection timing. The spark control module 218 controls the spark plug 128 by instructing the spark actuator module 126 to achieve desired spark timing.

The valve control module 220 controls the position of the intake and exhaust valves 122 and 130 by instructing the valve actuator module 152 to achieve desired valve positions. The intake control module 222 controls the length of the intake duct 109 and/or the intake manifold 110 by instructing the intake actuator module 117 to achieve a desired length. The boost control module 224 controls the wastegate 162 by instructing the boost actuator module 164 to achieve a desired wastegate position. The TCM 198 shifts the transmission 170 according to a desired shift schedule.

In various implementations, the communication module 202 may communicate directly with the control modules 198 and 214-224, and the control modules 198 and 214-224 may perform the functions of the powertrain performance module 204. For example, the throttle control module 214 may control the throttle valve 112 based on a first set of values for the throttle area before the second wireless signal 212 is received. Then, when the communication module 202 converts the signal 212 and sends the converted signal to the throttle control module 214, the throttle control module 214 may control the throttle valve 112 based on a second set of values for the throttle area. The throttle control module 214 may control the throttle valve 112 based on the second set of values until the selected period ends, at which point the throttle control module 214 may return to controlling the throttle valve 112 based on the first set of values.

The control modules 198 and 216-224 may control their respective actuator modules and/or actuators (e.g., the transmission 170) in a manner similar to the example manner described above with respect to the throttle control module 214. In addition, the control modules 198 and 216-224 may either receive the second set of values for their respective control parameters through the second wireless signal 212 or from a source other than the second wireless signal 212. If the control modules 198 and 216-224 receive the second set of values for their respective control parameters through the second wireless signal 212, the control modules 198 and 216-224 may delete the second set of values when the selected period ends. In the above example where the control modules 198 and 214-224 communicate directly with the communication module 202 and perform the functions of the powertrain performance module 204, the powertrain performance module 204 may be omitted.

A noise control module 226 controls the noise generated by the vehicle and/or perceived within a cabin of the vehicle. The noise control module 226 may control the vehicle noise by instructing the exhaust actuator module 139 to actuate the bypass valve 138 to a desired position. For example, the bypass valve 138 may be positioned to achieve a desired exhaust note. The noise control module 226 may control the vehicle noise by controlling the speakers 158 to generate a noise having a desired magnitude and/or frequency. For example, the microphone 156 may record the noise within the cabin, and the speakers 158 may be controlled to generate a noise that is (e.g., 180 degrees) out of phase relative to the recorded noise to decrease or cancel out the recorded noise. The speakers 158 may be controlled to cancel out noise having an undesired frequency without affecting noise having a desired frequency. The bypass valve 138 and the speakers 158 may be referred to as noise actuators.

The noise control module 226 may control the vehicle noise based on user preference in a manner similar to that in which the powertrain performance module 204 controls the powertrain based on user preference. For example, before the second wireless signal 212 is received, the noise control module 226 may control the vehicle noise based on a first set of values for the position of the bypass valve 138. Then, when the communication module 202 converts the signal 212 and sends the converted signal to the noise control module 226, the noise control module 226 may control the position of the bypass valve 138 based on a second set of values. The noise control module 226 may control the position of the bypass valve 138 based on the second set of values until the selected period ends, at which point the noise control module 226 may return to controlling the bypass valve 138 based on the first set of values. The user interface device 154 may provide the user with various options for adjusting the vehicle noise. For example, the user may select different types of noise (e.g., performance exhaust noise) and/or different levels of noise.

A user interface device (UID) control module 228 controls the appearance of the user interface device 154. The UID control module 228 may control the appearance of the user interface device 154 based on user preference in a manner similar to that in which the powertrain performance module 204 controls the powertrain based on user preference. For example, before the second wireless signal 212 is received, the UID control module 228 may control the appearance of the user interface device 154 based on a first set of display data. Then, when the communication module 202 converts the signal 212 and sends the converted signal to the UID control module 228, the UID control module 228 may control the appearance of the user interface device 154 based on a second set of display data. The UID control module 228 may control the appearance of the user interface device 154 based on the second set of display data until the selected period ends. When the selected period ends, the UID control module 228 may return to controlling the appearance of the user interface device 154 based on the second set of display data.

The user interface device 154 may provide the user with various options for adjusting the appearance of the user interface device 154. For example, the user may select different themes for the appearance of the user interface device 154 such as seasonal (e.g., fall, winter, spring, summer) themes or event (e.g., holiday) themes. In addition, the user may select different themes for the appearance of the text and/or controls on the user interface device 154, such as different sizes and fonts of the text or various styles and colors of virtual dials and knobs on the user interface device 154.

When the user requests a powertrain performance upgrade, a vehicle noise upgrade, or a display appearance upgrade using the user interface device 154, the manufacture of the vehicle and/or a third party may "pull" the upgrade from the user. In addition, the manufacture of the vehicle and/or a third party may user the server 208 to "push" an offer for the upgrade to the user. For example, the server 208 may transmit a third wireless signal 229 indicating the offer for a powertrain performance upgrade, a vehicle noise upgrade, and/or a display appearance upgrade. When the communication module 202 receives the third wireless signal 229, the communication module 202 may convert the third wireless signal 229 into a format that is readable by the user interface device 154, and the user interface device 154 may display the offer for the upgrade(s). The user may then accept the offer for the upgrade(s) using the user interface device 154. In turn, the communication module 202 may transmit the first wireless signal 210, which may indicate that the user has accepted the offer, and the server 208 may transmit the second wireless signal 212, which may enable the upgrade.

Figure 2B:
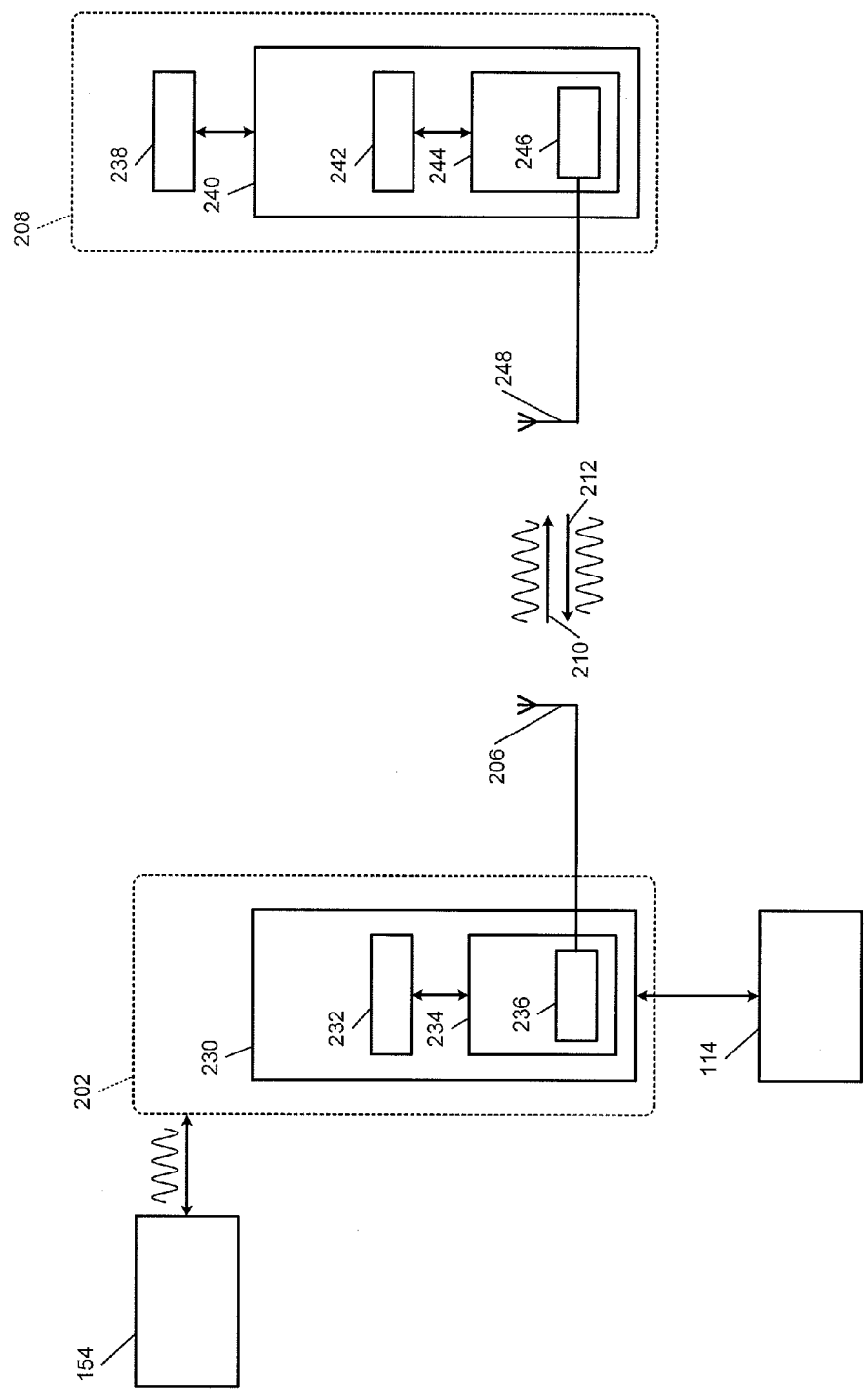

Referring now to FIG. 2B, an example of the communication module 202 and the server 208 is shown. In this example, the communication module 202 and the server 208 are configured to communicate with each other over a wireless local area network (WLAN). However, as discussed above, the communication module 202 and the server 208 may communicate with each other over other types of wireless communication networks.

The communication module 202 includes a network interface module 230 in communication with the ECM 114. The network interface 230 includes a medium access control (MAC) device 232 and a physical layer (PHY) device 234. The PHY device 234 includes a transceiver 236 that communicates with the antenna 206.

The server 208 includes a host processor 238 in communication with a network interface module 240. The network interface 240 includes a MAC device 242 and a PHY device 244. The PHY device 244 includes a transceiver 246 that communicates with an antenna 248. In this example, the ECM 114 may be referred to as a host processor, the ECM 114 and the network interface 230 may collectively be referred to as an access point, and the server 208 may be referred to as a client station.

The ECM 114, the MAC device 232, and/or the PHY device 234 of the access point and the host processor 238, the MAC device 242, and/or the PHY device 244 of the server 208 may be configured to generate data packets. The transceivers 236 and 246 include transmitter portions (i.e., transmitters) and receiver portions (i.e., receivers) respectively configured to transmit and receive the data packets via the respective antennas 206 and 248. In addition, the receiving devices (i.e., the access point and/or the server 208) are configured to selectively process the received data packets.

Figure 3:
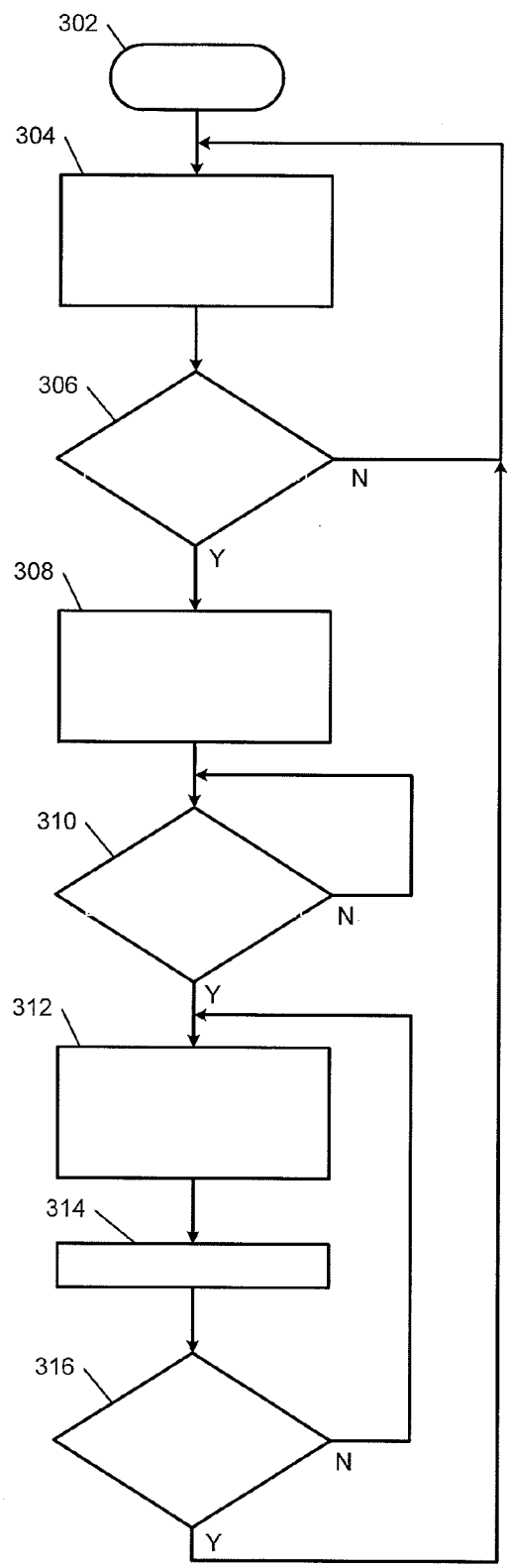
FIGS. 3 through 5 are flowcharts illustrating example control methods according to the principles of the present disclosure.

Referring now to FIG. 3, a method for enabling a user of a vehicle to adjust operation of a powertrain in the vehicle begins at 302. The method is described in the context of the modules included in the example implementation of the ECM 114 shown in FIG. 2 to further describe the functions performed by those modules. However, the particular modules that perform the steps of the method may be different than the description below and/or the method may be implemented apart from the modules of FIG. 2. For example, the method may be implemented by a single module.

At 304, a powertrain control module controls the powertrain using a first set of values for control parameters. The powertrain control module may refer to the powertrain performance module 204 and/or one or more of the control modules 198 and 214-224. The first set of values may be for control parameters used by one or more of the control modules 198 and 214-224.

At 306, the communication module 202 determines whether a user request to adjust powertrain operation is received. If a user request to adjust powertrain operation is received, the method continues at 308. Otherwise, the method continues at 304.

At 308, the communication module 202 transmits the first wireless signal 210, which may indicate the user request to adjust powertrain operation. At 310, the communication module 202 determines whether the second wireless signal 212 is received. The second wireless signal 212 may enable the powertrain control module to adjust powertrain operation according to the user request. If the second wireless signal 212 is received, the method continues at 312. Otherwise, the communication module 202 continues to determine whether the second wireless signal 212 is received at 310.

At 312, the powertrain control module controls the powertrain using a second set of values for the control parameters. The second set of values is different than the first set of values. At 314, the powertrain control module starts a timer.

At 316, the powertrain control module determines whether the timer is greater than a first period. If the timer is greater than the first period, the method continues at 304. Otherwise, the method continues at 312. The first period may be predetermined or indicated by the user request to adjust powertrain operation.

Figure 4:
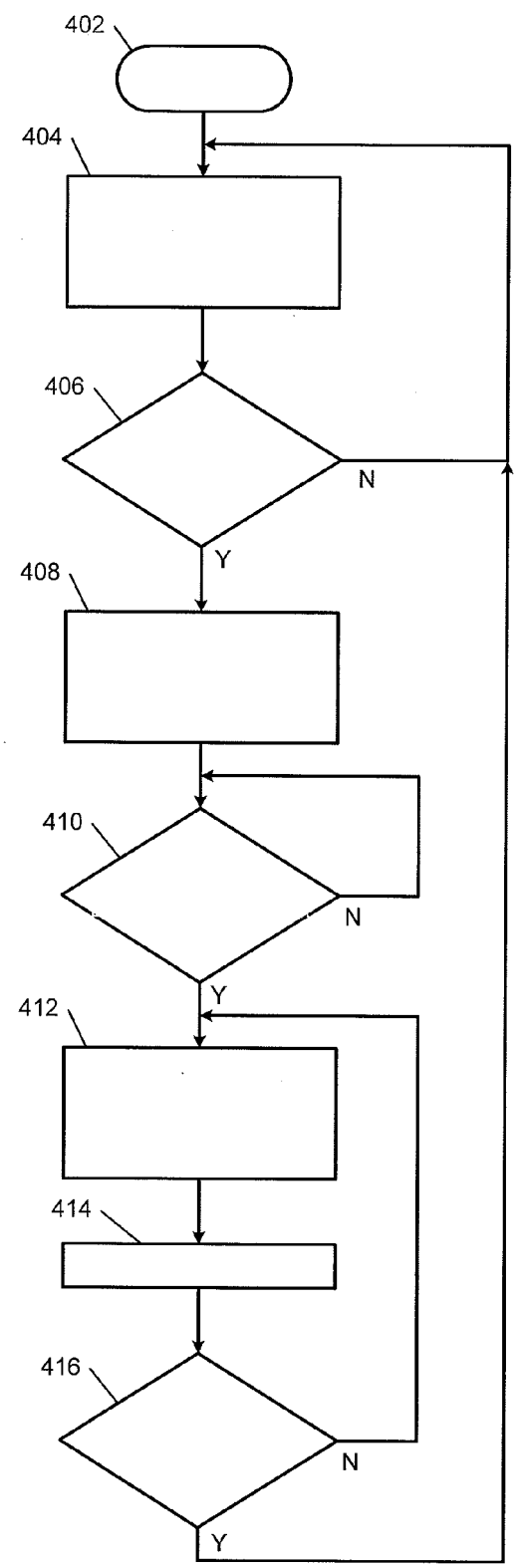

Referring now to FIG. 4, a method for enabling a user of a vehicle to adjust the noise generated by the vehicle and/or the noise perceived within a cabin of the vehicle begins at 402. The method is described in the context of the modules included in the example implementation of the ECM 114 shown in FIG. 2 to further describe the functions performed by those modules. However, the particular modules that perform the steps of the method may be different than the description below and/or the method may be implemented apart from the modules of FIG. 2. For example, the method may be implemented by a single module.

At 404, the noise control module 226 controls the vehicle noise using a first set of values for control parameters. The control parameters may include a desired position of the bypass valve 138. Additionally or alternatively, the control parameters may include a desired frequency and magnitude of noise generated by the speakers 158.

At 406, the communication module 202 determines whether a user request to adjust the vehicle noise is received. If a user request to adjust the vehicle noise is received, the method continues at 408. Otherwise, the method continues at 404.

At 408, the communication module 202 transmits the first wireless signal 210, which may indicate the user request to adjust the vehicle noise. At 410, the communication module 202 determines whether the second wireless signal 212 is received. The second wireless signal 212 may enable the noise control module 226 to adjust the vehicle noise according to the user request. If the second wireless signal 212 is received, the method continues at 412. Otherwise, the communication module 202 continues to determine whether the second wireless signal 212 is received at 410.

At 412, the noise control module 226 controls the vehicle noise using a second set of values for the control parameters. The second set of values is different than the first set of values. At 414, the noise control module 226 starts a timer.

At 416, the noise control module 226 determines whether the timer is greater than a first period. If the timer is greater than the first period, the method continues at 404. Otherwise, the method continues at 412. The first period may be predetermined or the user request to adjust the vehicle noise.

Figure 5:
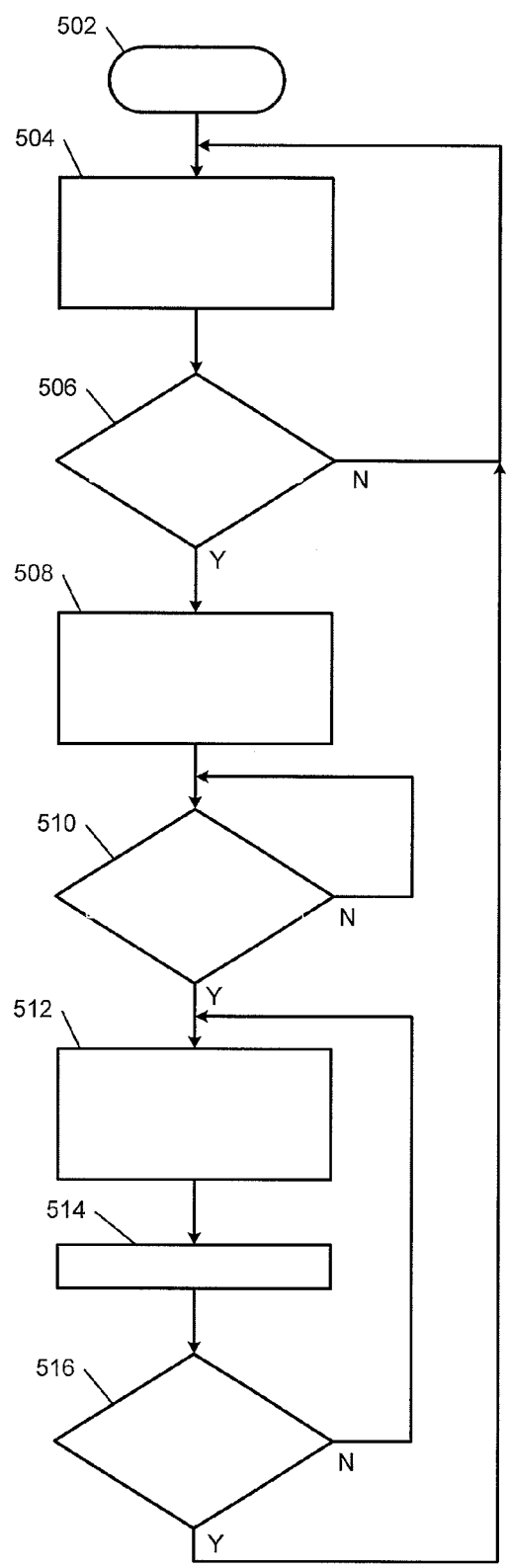

Referring now to FIG. 5, a method for enabling a user of a vehicle to adjust the appearance of a display within the vehicle begins at 502. The method is described in the context of the modules included in the example implementation of the ECM 114 shown in FIG. 2 to further describe the functions performed by those modules. However, the particular modules that perform the steps of the method may be different than the description below and/or the method may be implemented apart from the modules of FIG. 2. For example, the method may be implemented by a single module.

At 504, the UID control module 228 controls the appearance of the display using a first set of display data. The display data may be adjusted to adjust the appearance of the display using different themes such as seasonal themes, event themes, and/or themes for the appearance of the text and/or controls on the display. At 506, the communication module 202 determines whether a user request to adjust the appearance of the display is received. If a user request to adjust the appearance of the display is received, the method continues at 508. Otherwise, the method continues at 504.

At 508, the communication module 202 transmits the first wireless signal 210, which may indicate the user request to adjust the vehicle noise. At 510, the communication module 202 determines whether the second wireless signal 212 is received. The second wireless signal 212 may enable the UID control module 228 to adjust the appearance of the display according to the user request. If the second wireless signal 212 is received, the method continues at 512. Otherwise, the communication module 202 continues to determine whether the second wireless signal 212 is received at 510.

At 512, the noise control module 226 controls the vehicle noise using a second set of values for the control parameters. The second set of values is different than the first set of values. At 514, the noise control module 226 starts a timer.

At 516, the noise control module 226 determines whether the timer is greater than a first period. If the timer is greater than the first period, the method continues at 504. Otherwise, the method continues at 512. The first period may be predetermined or indicated by the user request to adjust the appearance of the display.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A system comprising:
a communication module that:
transmits a first wireless signal indicating a request from a user of a vehicle to adjust operation of at least one of a powertrain in the vehicle, a display in the vehicle, and a noise actuator in the vehicle; and
receives a second wireless signal enabling operation of the at least one of the powertrain, the display, and the noise actuator to be adjusted according to the request; and
a control module that:
controls the at least one of the powertrain, the display, and the noise actuator based on a first set of values for a control parameter before the second wireless signal is received; and
controls the at least one of the powertrain, the display, and the noise actuator based on a second set of values for the control parameter after the second wireless signal is received.

2. The system of claim 1 wherein the control parameter affects at least one of an amount of torque produced by an engine, fuel economy of the vehicle, and an ability of the engine to start.

3. The system of claim 1 wherein the control parameter includes at least one of a throttle area, fuel injection timing, an amount of fuel injected for each fuel injection, a number of fuel injections for each combustion event, spark timing, a number of active cylinders, a camshaft phaser position, an intake manifold length, a wastegate position, and a transmission shift schedule.

4. The system of claim 1 wherein the control module:
controls the at least one of the powertrain, the display, and the noise actuator based on the second set of values for a first period after the second wireless signal is received; and
controls the at least one of the powertrain, the display, and the noise actuator based on the first set of values when the first period ends.

5. The system of claim 4 wherein the request indicates the first period.

6. The system of claim 4 wherein:
the control module receives the second set of values from a source other than the second wireless signal; and
the second wireless signal authorizes control of the at least one of the powertrain, the display, and the noise actuator based on the second set of values.

7. The system of claim 4 wherein the control module receives the second set of values through the second wireless signal.

8. The system of claim 7 wherein the control module deletes the second set of values when the first period ends.

9. The system of claim 1 wherein:
the request from the user is a request to adjust a noise perceived within a cabin of the vehicle;
the second wireless signal enables the noise perceived within the cabin of the vehicle to be adjusted according to the request; and
the control module controls at least one of a muffler bypass valve in the vehicle and a speaker in the cabin of the vehicle according to the request when the second wireless signal is received.

10. The system of claim 1 wherein:
the request from the user is a request to adjust the display of a user interface device in the vehicle;
the second wireless signal enables the display of the user interface device to be adjusted according to the request; and
the system further comprises a user interface device (UID) control module that adjusts the display of the user interface device according to the request when the second wireless signal is received.

11. The system of claim 1 wherein the communication module receives a third wireless signal indicating an offer to the user to adjust operation of the at least one of the powertrain, the display, and the noise actuator.

12. A method comprising:
transmitting a first wireless signal indicating a request from a user of a vehicle to adjust operation of at least one of a powertrain in the vehicle, a display in the vehicle, and a noise actuator in the vehicle;
receiving a second wireless signal enabling operation of the at least one of the powertrain, the display, and the noise actuator to be adjusted according to the request;
controlling the at least one of the powertrain, the display, and the noise actuator based on a first set of values for a control parameter before the second wireless signal is received; and
controlling the at least one of the powertrain, the display, and the noise actuator based on a second set of values for the control parameter after the second wireless signal is received.

13. The method of claim 12 wherein the control parameter affects at least one of an amount of torque produced by an engine, fuel economy of the vehicle, and an ability of the engine to start.

14. The method of claim 12 wherein the control parameter includes at least one of a throttle area, fuel injection timing, an amount of fuel injected for each fuel injection, a number of fuel injections for each combustion event, spark timing, a number of active cylinders, a camshaft phaser position, an intake manifold length, a wastegate position, and a transmission shift schedule.

15. The method of claim 12 further comprising:
controlling the at least one of the powertrain, the display, and the noise actuator based on the second set of values for a first period after the second wireless signal is received; and
controlling the at least one of the powertrain, the display, and the noise actuator based on the first set of values when the first period ends.

16. The method of claim 15 wherein the request indicates the first period.

17. The method of claim 15 further comprising receiving the second set of values from a source other than the second wireless signal, wherein the second wireless signal authorizes control of the at least one of the powertrain, the display, and the noise actuator based on the second set of values.

18. The method of claim 15 further comprising receiving the second set of values through the second wireless signal.

19. The method of claim 18 further comprising deleting the second set of values when the first period ends.

20. The method of claim 12 wherein:
the request from the user is a request to adjust a noise perceived within a cabin of the vehicle;
the second wireless signal enables the noise perceived within the cabin of the vehicle to be adjusted according to the request; and
the method further comprises controlling at least one of a muffler bypass valve in the vehicle and a speaker in the cabin of the vehicle according to the request when the second wireless signal is received.

21. The method of claim 12 wherein:
the request from the user is a request to adjust the display of a user interface device in the vehicle;
the second wireless signal enables the display of the user interface device to be adjusted according to the request; and
the method further comprises adjusting the display of the user interface device according to the request when the second wireless signal is received.

22. The method of claim 12 further comprising receiving a third wireless signal indicating an offer to the user to adjust operation of the at least one of the powertrain, the display, and the noise actuator.

* * * * *